US008093496B2

(12) United States Patent
Keith (10) Patent No.: US 8,093,496 B2
(45) Date of Patent: Jan. 10, 2012

(54) CABLE MANAGEMENT SYSTEM FOR MOVEABLE COMMUNICATION PANELS

(75) Inventor: Scott Martin Keith, Plano, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 472 days.

(21) Appl. No.: 12/361,001

(22) Filed: Jan. 28, 2009

(65) Prior Publication Data

US 2009/0194647 A1 Aug. 6, 2009

Related U.S. Application Data

(60) Provisional application No. 61/024,995, filed on Jan. 31, 2008.

(51) Int. Cl.
*H02G 3/08* (2006.01)

(52) U.S. Cl. .......... 174/50; 174/480; 439/131; 385/135; 248/70

(58) Field of Classification Search .................. 174/480, 174/50; 439/131, 565, 489; 361/823, 724; 385/135; 248/70; 379/413.04
See application file for complete search history.

(56) References Cited

U.S. PATENT DOCUMENTS

| | | | | |
|---|---|---|---|---|
| 6,599,149 | B2 * | 7/2003 | Chen | 439/565 |
| 6,788,786 | B1 | 9/2004 | Kessler et al. | |
| 7,462,779 | B2 * | 12/2008 | Caveney et al. | 174/68.1 |
| 7,499,622 | B2 * | 3/2009 | Castonguay et al. | 385/135 |
| 7,522,805 | B2 * | 4/2009 | Smith et al. | 385/135 |
| 7,526,171 | B2 * | 4/2009 | Caveney et al. | 385/135 |
| 7,831,125 | B2 * | 11/2010 | Smith et al. | 385/135 |

FOREIGN PATENT DOCUMENTS

EP 0 909 102 A2 4/1999
WO WO 2006/012389 A1 2/2006

OTHER PUBLICATIONS

International Search Report and Written Opinion (12 pages) corresponding to International Application No. PCT/US2009/000553; Mailing Date: Jun. 3, 2009.

* cited by examiner

*Primary Examiner* — Dhirubhai R Patel (74) *Attorney, Agent, or Firm* — Myers Bigel Sibley & Sajovec (57) ABSTRACT

A cable management system or member has an optional enclosure and annular hubs defining an axis. A rotatable support frame is attached to the annular hubs, with a patching field having a plurality of ports and first and second primary sides attached to the rotatable support frame. Rotation of the rotatable support frame about the axis produces corresponding rotation of the annular hubs. When cable bundles pass through the annular hubs, they may also rotate with the support frame, reducing or eliminating the need for cable slack loops and reducing or eliminating stress at cable/port connection points.

31 Claims, 14 Drawing Sheets

CABLE MANAGEMENT SYSTEM FOR MOVEABLE COMMUNICATION PANELS

RELATED APPLICATION

This application claims the benefit of priority of U.S. Provisional Application Ser. No. 61/024,995, filed Jan. 31, 2008, the contents of which are hereby incorporated by reference as if recited in full herein.

FIELD OF THE INVENTION

The present invention relates generally to zone cabling and more particularly to cable management in relation to zone boxes and enclosures.

BACKGROUND

Zone cabling typically involves the use of intermediate connection points for horizontal cabling (copper or fiber). The intermediate connection points are logically placed between a telecommunications closets/rooms and work areas/zones. The intermediate connection points are generally enclosed, such as in a zone box, and may be located in a plenum ceiling and under floor spaces, or mounted to a wall or rack. In-ceiling and raised floor mount zone enclosures can be integrated into existing ceiling tile and raised floor systems, increasing aesthetic appeal.

Zone cabling is becoming increasingly popular due to design and maintenance flexibility. More specifically, reconfigurations can be simpler and can be performed in a more efficient manner, reducing system downtime. Moreover, the use of zone cabling can result in the elimination or reduction in the number of telecommunication closets or rooms, freeing up valuable space in buildings and workplaces.

Unfortunately, current zone cabling systems possess several disadvantages. For example, current enclosures often orient patching fields (generally comprised of one or more patch panels) at awkward angles, resulting in difficulty for installers and technicians. A related disadvantage of current designs is limited access to one or both sides of patching fields, hindering installation and/or maintenance. This can be especially frustrating with regard to in-ceiling and raised floor mount enclosures, which can force technicians to work in dark and cramped spaces.

In part to deal with these design shortcomings, current zone cabling systems typically require cable slack loops stored in the enclosure to allow the patching fields and other components to move and thereby be accessed from the rear. Cable slack loops lead to two main disadvantages. First, slack loops typically require more cable material and take up valuable space inside the enclosure. This increases cost and reduces the potential port density (i.e., number of ports per unit of enclosure volume). Second, slack loops may require a considerable amount of force to move and flex. The result is increased stress at the cable/port interfaces when the patching fields and connected cables are moved.

Therefore, there may be a need for improved zone cabling systems to address some of the aforementioned design problems. More specifically, there may be a need for a cable management system that: 1) reduces or eliminates the need for excess cable, or slack loops, within the enclosure, thereby reducing material and allowing for greater port density; 2) reduces or eliminates stress at the cable/port connection points; 3) reduces the effort required by an operator to manipulate components, including patching fields; and/or 4) provides a wider range of motion of components, including patching fields, to allow for easier access, especially to the rear of patching fields.

SUMMARY

In view of the above, embodiments of the invention provide cable management systems and members useful in cable management systems.

Some embodiments are directed to a cable management systems. The cable management systems include an enclosure. At least one annular hub is attached to the enclosure and defines an axis, and a rotatable support frame is attached to the at least one annular hub. A patching field including a plurality of ports and having first and second primary sides is mounted to the rotatable support frame. Rotation of the rotatable support frame about the axis produces corresponding rotation of the at least one annular hub.

In some embodiments, the cable management system further includes a cable bundle passing through the at least one annular hub. The cable bundle includes cables that connect to the patching field. Rotation of the rotatable support frame about the axis produces corresponding rotation of the at least one annular hub. Because these components all rotate about a common axis defined by the annular hubs, the need for cable slack loops is reduced or eliminated. Furthermore, stress at the cable/port connection points is reduced or eliminated.

Other embodiments are directed to members useful in cable management systems. The member includes at least one annular hub defining an axis. A rotatable support frame is attached to the at least one annular hub. A patching field including a plurality of ports and having first and second primary sides is mounted to the rotatable support frame. Rotation of the rotatable support frame about the axis produces corresponding rotation of the at least one annular hub.

DETAILED DESCRIPTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly. As used herein, "vertical" has the conventional meaning, i.e., upright; or at a right angle to the horizon, and "horizontal" as the conventional meaning of being coplanar to the horizon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Figure 1:
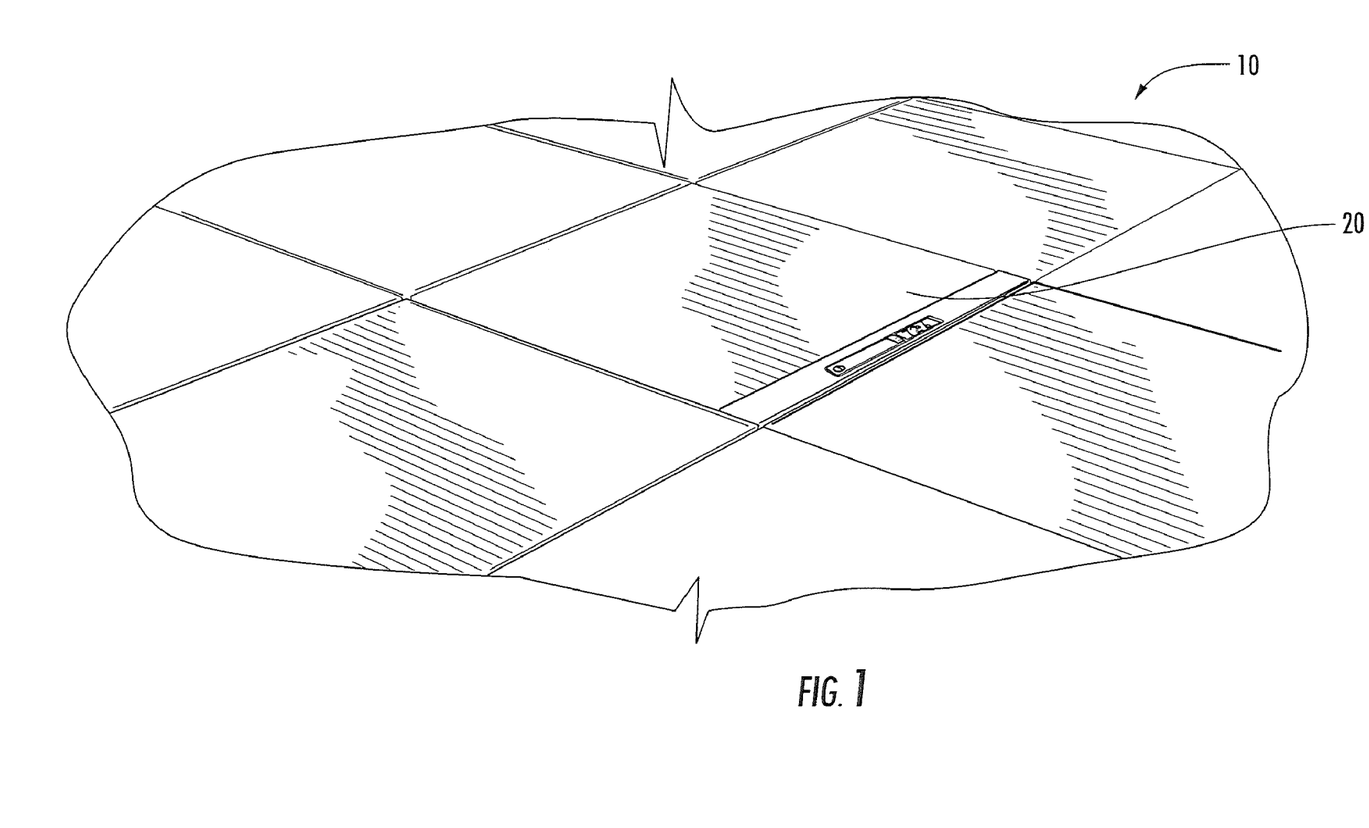
FIG. 1 is a perspective view of a tile floor or ceiling including a tile floor or ceiling mount cable management system according to some embodiments of the present invention.

Turning now to the drawings, FIG. 1 is a perspective view of a tile floor 10. The tile floor 10 includes a floor tile insert 20, which may also serve as a cover for an enclosure, such as a zone box (see FIGS. 4-9). The floor tile insert 20 may be integrated with and/or connected to the enclosure or may be a distinct component and separate from the enclosure.

Figure 2:
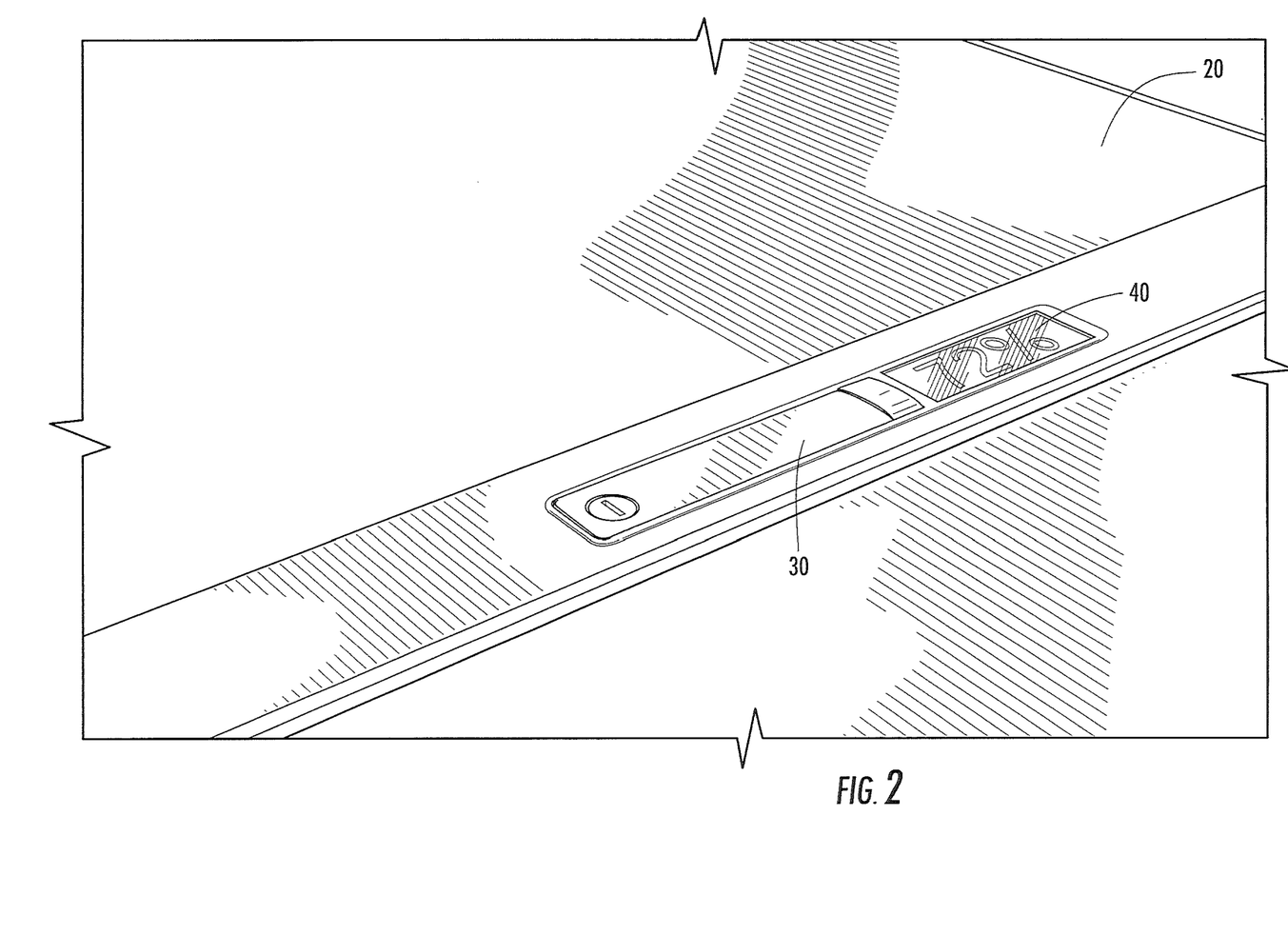
FIG. 2 is an enlarged perspective view of the system of FIG. 1.
Figure 3:
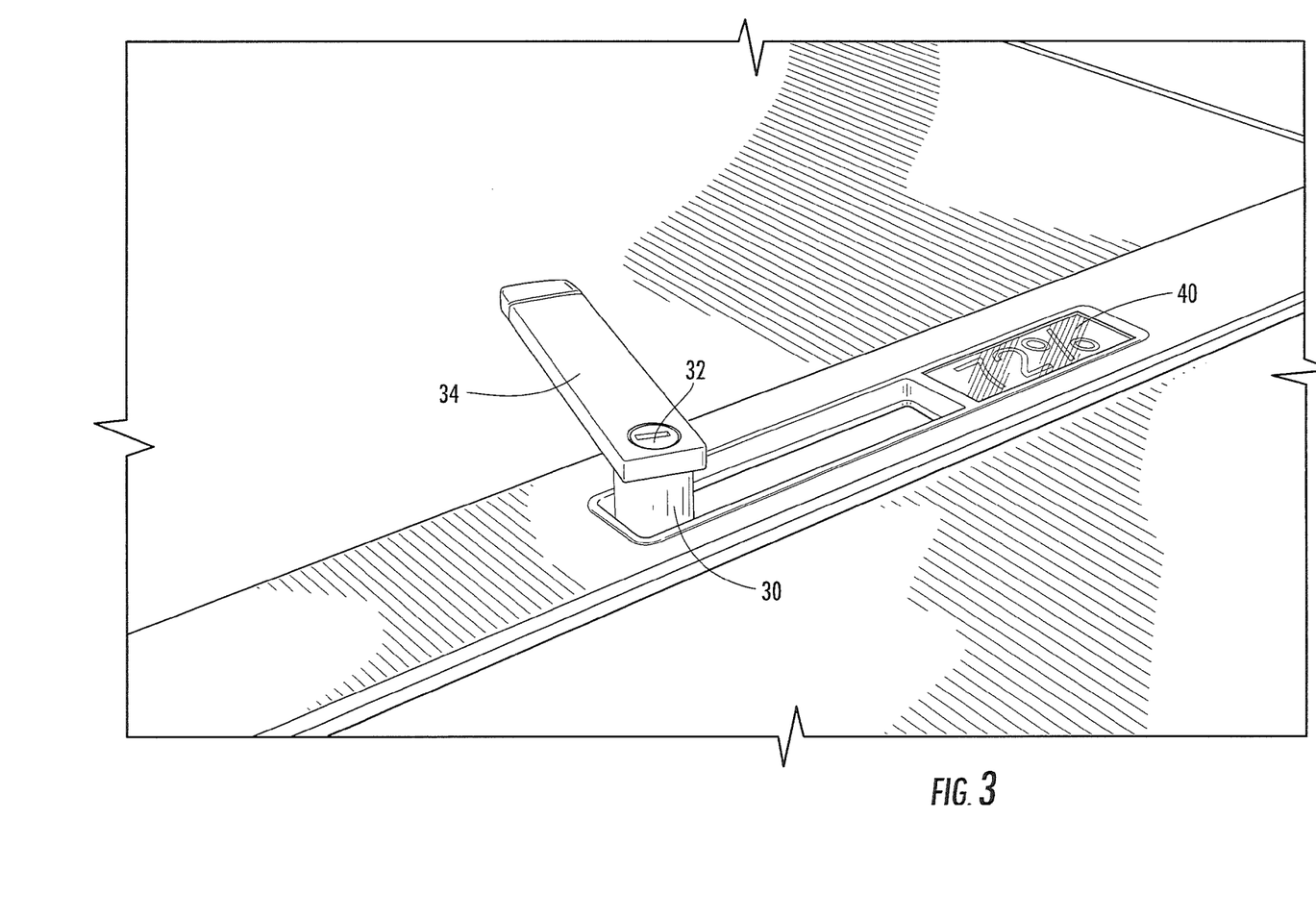
FIG. 3 is an enlarged perspective view of the system of FIG. 1 with its handle disengaged.

Referring to FIGS. 2 and 3, the floor tile insert 20 may include a handle 30. As seen in FIG. 3, the handle 30 may include a lock 32 and an elongated member 34. The lock 32 may provide security for components inside the enclosure below. The elongated member 34 may swing outwardly once the lock 32 is disengaged. In this regard, an operator may enjoy increased accessibility in that the floor tile insert 20 may be lifted via the elongated member 34.

The floor tile insert 20 may also include an electronic display 40. The display may communicate information with regard to the enclosure and its contents (see FIGS. 4-9). The display may be helpful for a technician when looking for an available connection point, for example. In the exemplary embodiments shown in FIGS. 2 and 3, the technician would be alerted that the enclosure associated with the electronic display 40 has 72% of its connection points in use (or, alternatively, 72% of its connection points available). Accordingly, the electronic display 40 may serve to reduce confusion and increase technician efficiency.

FIGS. 4-9 display a cable management system 45. As discussed above, the floor tile insert 20 may be integrated with an enclosure 50. In this regard, the floor tile insert 20 serves as the top of the enclosure 50 and, when lifted, exposes the contents of the enclosure 50. A hinge mechanism 52 located at an interface of the floor tile insert 20 and the enclosure 50 may permit the floor tile insert 20 to be lifted from the enclosure 50. In some embodiments, the hinge mechanism 52 would permit the floor tile insert 20 to swing at least 90 degrees such that the enclosure 50 and its contents are completely exposed (see FIG. 5).

The underside of the floor tile insert 20 may include at least one active component 60. Exemplary active components include network switches, telecommunication hubs, routers, equipment related to "intelligent systems" such as the iPatch® system (available from CommScope, Inc., Hickory, N.C.) and/or building automation. The depth of the enclosure 50 may determine whether at least one active component 60 may be included. Exemplary enclosure depths range between about 6 inches to about 14 inches. At least one active component 60 may generally be included on the underside of the floor tile insert 20 when the depth of the enclosure 50 is at least about 12 inches.

The enclosure 50 may include at least one opening 70 through which a cable bundle may be routed. The opening 70 should have a diameter at least as large as an annular hub associated with a support frame as discussed in more detail below. Alternatively, at least one annular hub 80 may be fixed to the enclosure 50, with a support frame as discussed below attached to the at least one annular hub 80. In any event, the opening 70 and/or the annular hub 80 may to have a diameter of at least about 3.5 inches to accommodate cables for three 1U patch panels.

Figure 5:
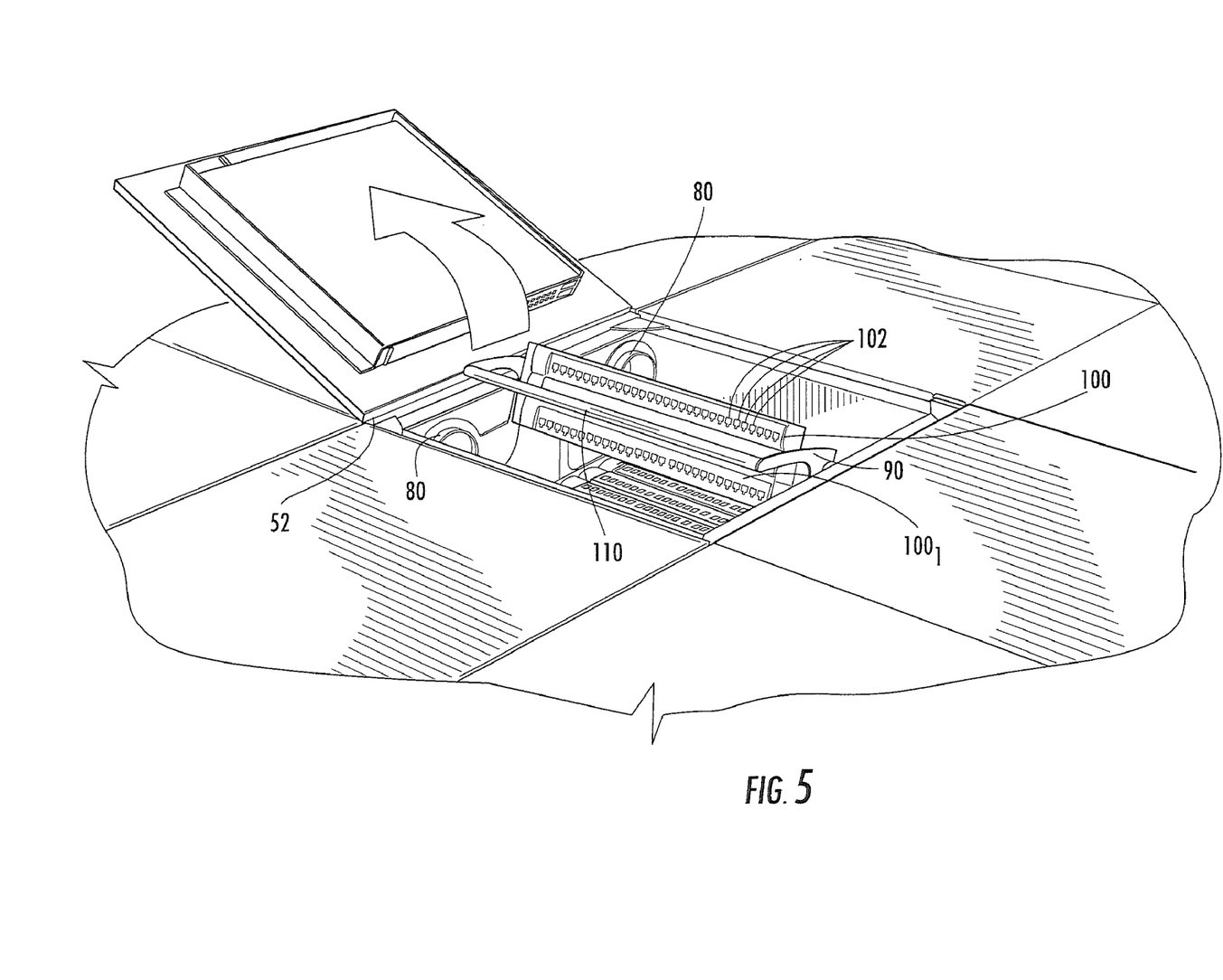
FIG. 5 is a perspective view of the system of FIG. 1 in which the support frame is partially rotated.
Figure 6:
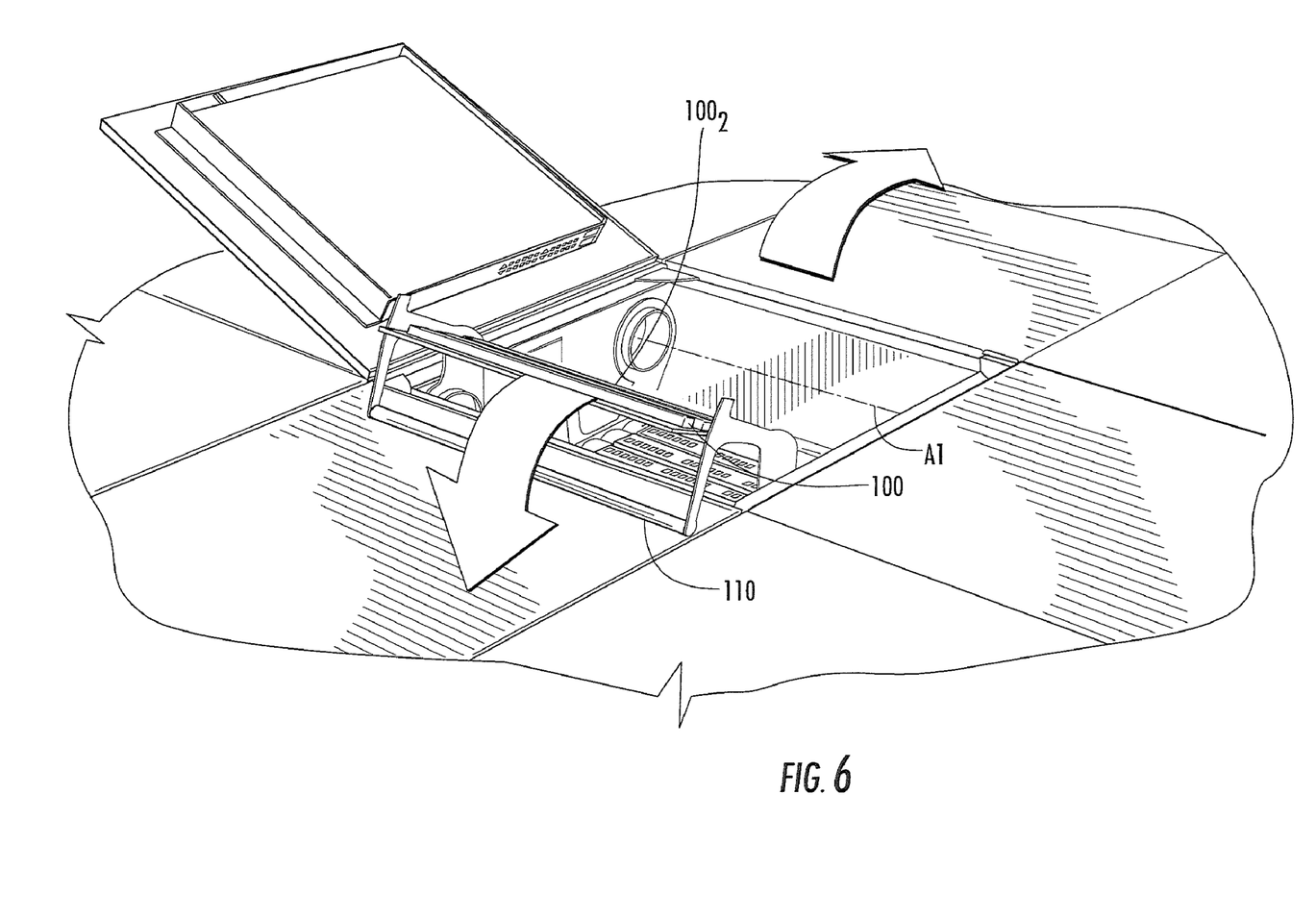
FIG. 6 is a perspective view of the system of FIG. 1 in which the support frame is fully rotated.
Figure 7:
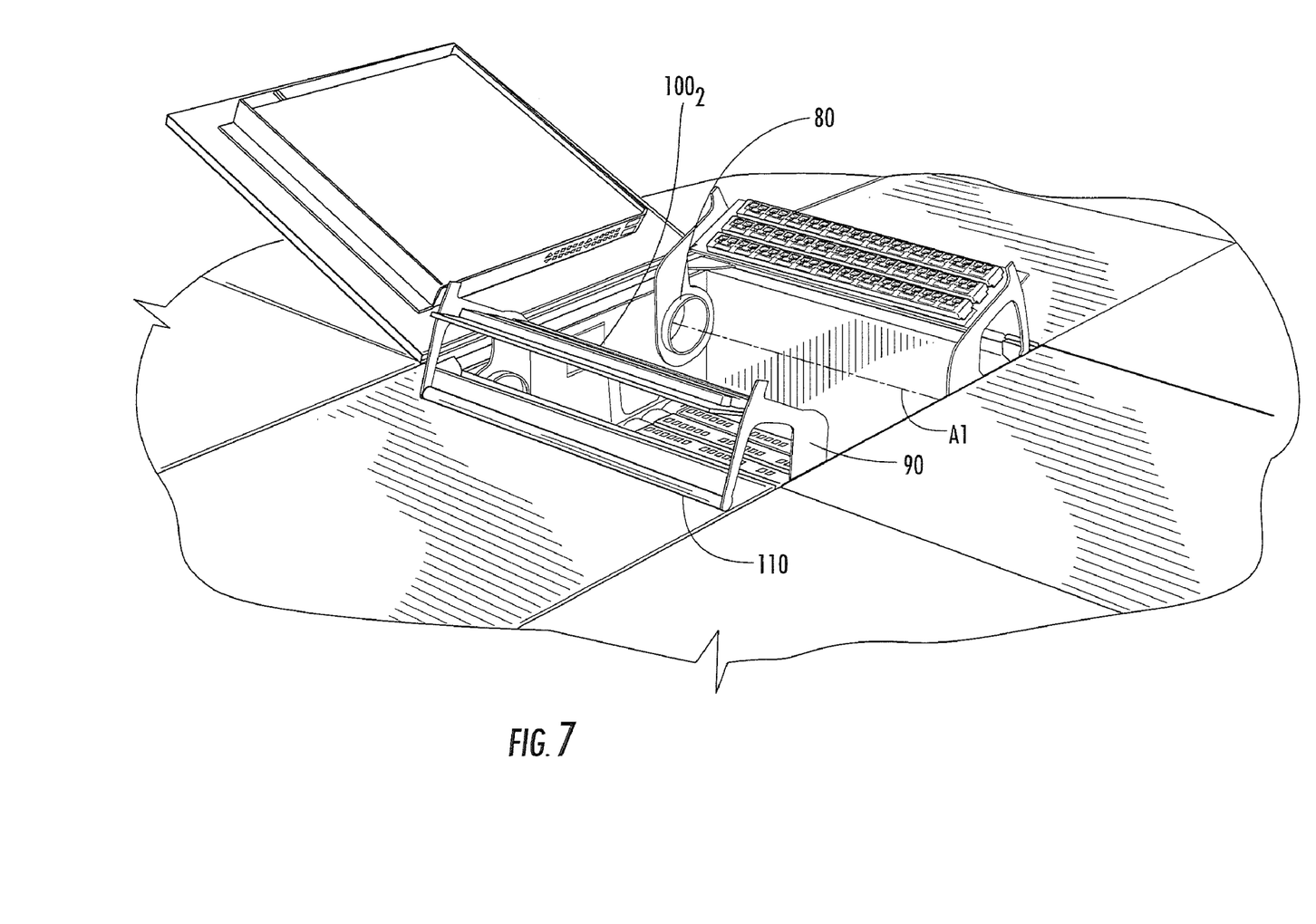
FIG. 7 is a perspective view of the system of FIG. 1 in which two fully rotated support frames are shown.

Referring to FIGS. 4-7, at least one support frame 90 may be positioned within the enclosure 50. The support frame 90 may be fixed to the annular hub(s) 80. Mounted on each support frame 90 is a patching field 100 having first and second primary sides $100_1$, $100_2$. The patching field 100 comprises a plurality of ports 102. In some embodiments, and as shown in FIG. 7, the enclosure 50 may house two support frames 90 with a patching field 100 mounted on each support frame 90, with each support frame 90 being fixed to two annular hubs 80. In some embodiments, each patching field 100 may comprise three 1U patch panels. In this regard, the enclosure 50 housing two support frames 90 with a patching field 100 mounted on each can accommodate a total of six 1U patch panels. In one exemplary configuration, this would provide 144 copper wire connections. For an exemplary IDC Punch Down system, this configuration would provide 96 connections.

As seen in FIG. 5, as the floor tile insert 20 is rotated upward (as indicated by the arrow), the support frames 90 and the patching fields 100 mounted thereon are exposed. Initially, only the first primary sides $100_1$ of the patching fields 100 are exposed. A member 110 (e.g., a handle) may be connected to or integrated with the support frame 90. The member 110 facilitates rotation of the support frame 90 about an axis A1 defined by the annular hubs 80 attached to the support frame (see FIG. 7). The rotation of the support frame 90 elevates and rotates the attached patching field 100, as seen in FIG. 5. As seen in FIG. 6, the support frame 90 may be further rotated using the member 110 such that the second primary side $100_2$ of the patching field 100 is exposed. Accordingly, this design can ease installation and maintenance in that both sides of the patching field 100 can be easily accessed. Installation and/or maintenance may be further facilitated in that the patching field 100 is raised from the floor plenum as it is rotated, providing more light for a technician.

Figure 4:
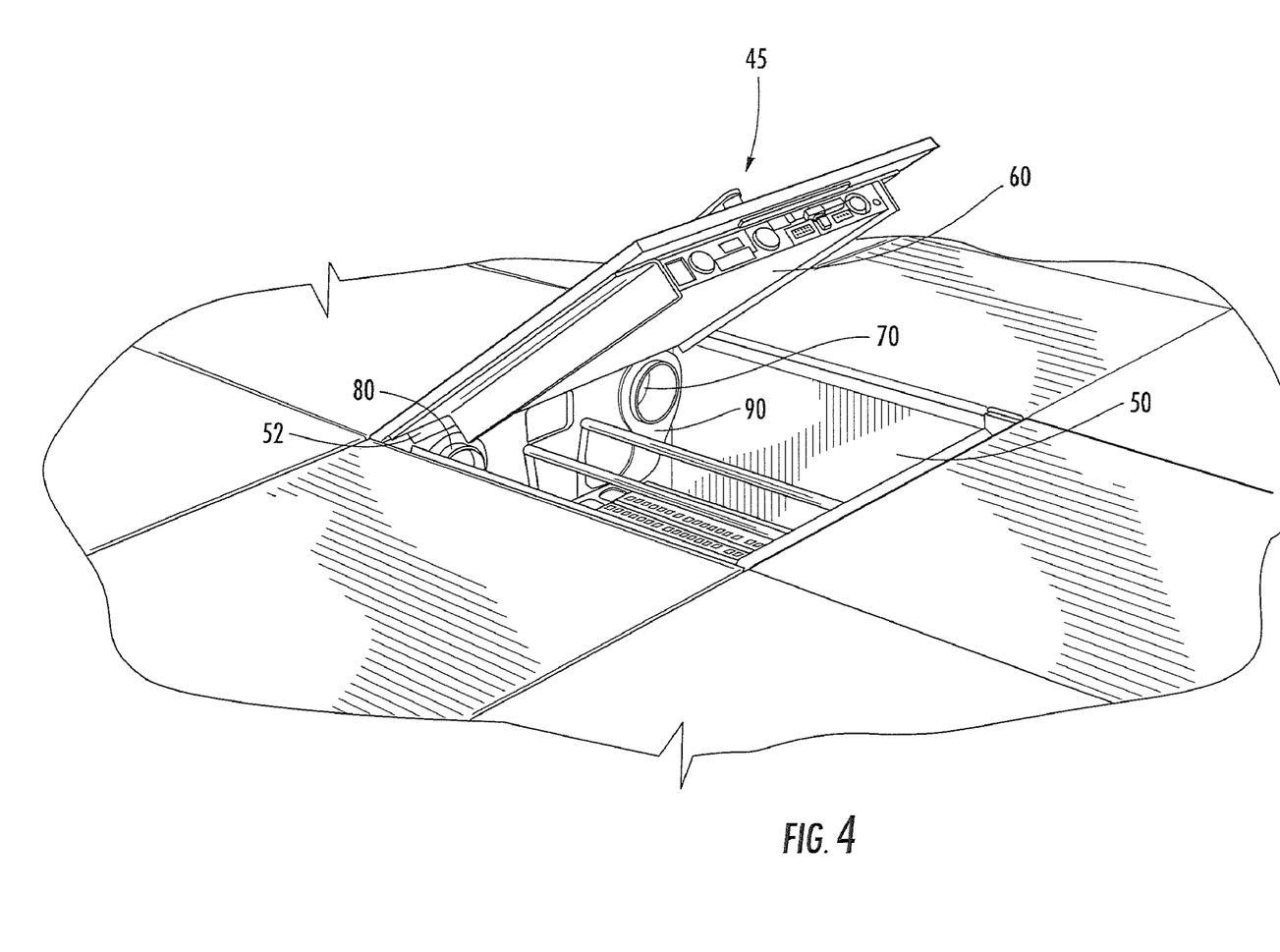
FIG. 4 is a perspective view of the system of FIG. 1 where the floor or ceiling tile insert is partially open.

The member 110 may serve additional purposes. For example, as seen in FIG. 4, when the support frames 90 are in their "retracted" position, the members 110 may protect components such as the patching fields 100 and connected cables from falling objects. Furthermore, as seen in FIGS. 6 and 7, the member 110 can rest on an adjacent floor tile such that a technician does not have to maintain a grip on the member 110 while working on the system, particularly the second primary side $100_2$ of the patching field 100. The member 110 can also serve as a stop to prevent over-rotation of the support frame 90. In this regard, and as seen in FIG. 6, at least the first primary side $100_1$ of the patching field 100 and connected cables are prevented from crashing into an adjacent tile.

Figure 8:
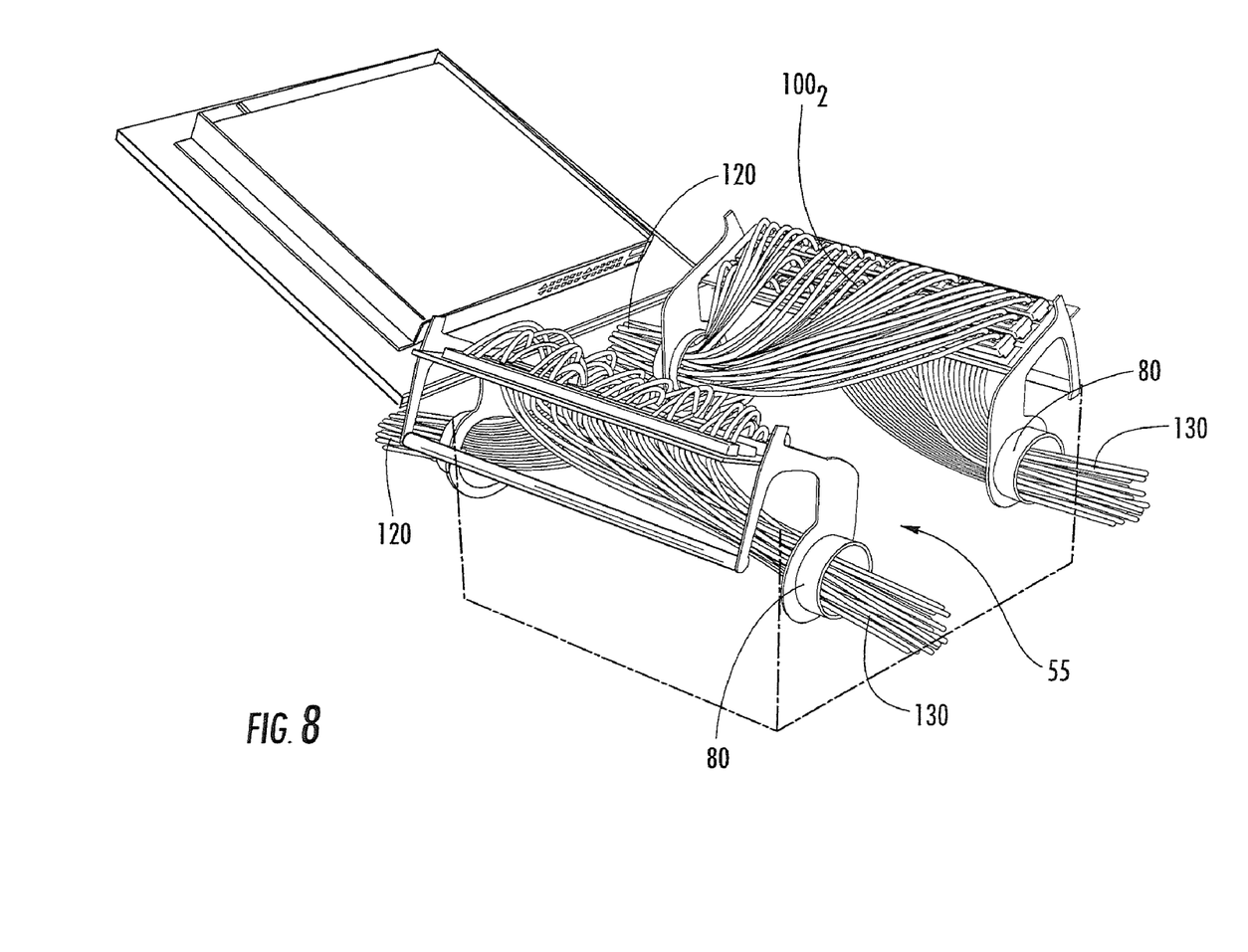
FIG. 8 is a perspective view of the system of FIG. 1 with cable bundles passing through annular hubs as the support frames are fully rotated.
Figure 9:
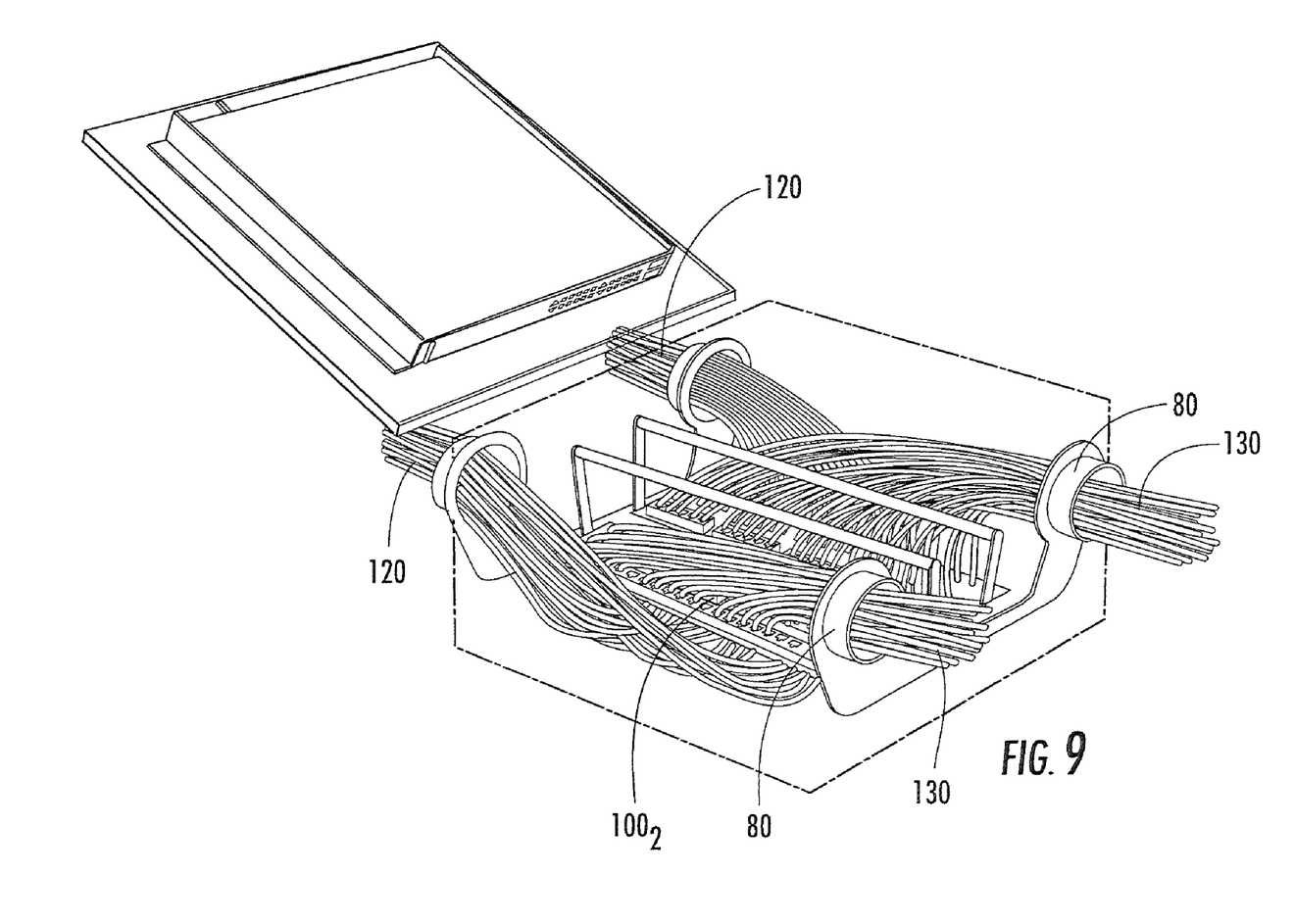
FIG. 9 is a perspective view of the system of FIG. 1 with cable bundles passing through annular hubs as the support frames are in the closed position.

As shown in FIGS. 8 and 9, two pair of cable bundles 120, 130 are routed through the openings 70 in the enclosure and the annular hubs 80. In this particular embodiment, the first pair of cable bundles 120 "enter" the enclosure 50 through the opening 70 and annular hub 80 at a first position near the interface of the floor tile insert 20 and the enclosure 50, such as near the hinge mechanism 52. The second pair of cable bundles 130 "exit" the enclosure 50 through the opening 70 and annular hub 80 at a second position on the opposite side of the enclosure 50.

Each of the cable bundles 120, 130 comprises a plurality of cables. In the embodiment shown in FIGS. 8 and 9, the cables making up the cable bundles 120 connect to the ports on the second primary sides $100_2$ of the patching fields 100 and the cables making up the cable bundles 130 connect to the ports on the first primary sides $100_1$ of the patching fields 100.

The cable bundles 120, 130 and their associated cables shown in the embodiments of FIGS. 8 and 9 generally do not include a slack loop. In previous zone cabling or zone box designs, slack loops are stored inside the enclosure to allow the patching fields to be moved. As discussed above, such movement is typically necessary to allow for installation and maintenance, especially with regard to the "rear" of the patching field, similar to the second primary sides $100_2$ of the patching fields 100 as seen in the embodiments in FIGS. 7 and 8, for example. However, cable slack loops can cause problems such as requiring more space in the enclosure and requiring force to move and flex, thereby creating stress at the cable/port connection points.

The embodiments shown in FIGS. 8 and 9 can avoid these problems by eliminating or significantly reducing the need for cable slack loop. For reference purposes, the cable management system as pictured in FIG. 9 can be considered in the "closed" or "retracted" position. That is, the floor tile insert 20 has been opened (such as via the hinge mechanism 52) to expose the interior of the enclosure 50. In this position, the first primary side $100_1$ of the patching field 100 can be accessed to some degree, but the second primary side $100_2$ of the patching field 100 cannot be accessed. As discussed above, previous zone cabling or zone box designs typically require cable slack loops stored within the enclosure in order to move (e.g., lift) the patching field 100 and access the second primary side $100_2$ of the patching field 100.

However, in the embodiments shown in FIGS. 8 and 9, the cable bundles 120, 130 pass through the center of rotation of the support frames 90 (e.g., through the annular hubs 80). This is illustrated in FIG. 8. Because the support frames 90 are fixed to the annular hubs 80, when the support frames 90 are rotated, the annular hubs 80 rotate as well, all about a common axis defined by the annular hubs 80. In some embodiments, the cable bundles 120, 130 rotate as well, also about the common axis defined by the annular hubs 80. In this regard, because there is no lateral or axial movement of the cables making up the cable bundles 120, 130, there is little to no need for slack loops.

For reference purposes, the cable management system as pictured in FIG. 8 can be considered in the "open" or "up" position. This position may be reached by rotating the support frame(s) 90, as seen in FIG. 8. Rotation of the support frames 90 results in corresponding rotation of the annular hubs 80 about a common axis defined by the annular hubs 80. The cable bundles 120, 130 may rotate about a common axis defined by the annular hubs 80 as well. Rotation of the support frames 90 may be aided by the members 110. By rotating the support frames 90, the second primary surfaces $100_2$ of the patching fields 100 are easily accessed. Once again, this is accomplished with little to no slack loop and with reduction of stress at the cable/port connection points.

It is further contemplated that the support frames 90 may be rotated to an angle between those pictured in FIGS. 8 and 9 (e.g., the support frames may be rotated approximately 90 degrees). In this regard, both the first primary side $100_1$ and the second primary side $100_2$ of the patching field 100 may be easily accessed. Furthermore, this method may allow the first primary side $100_1$ of the patching fields 100 to be at least partially removed from the enclosure 50, providing light and perhaps easier overall access to the first primary side $100_1$ as opposed to when the cable management system is in its "closed" or "retracted" position as shown in FIG. 9.

Figure 10:
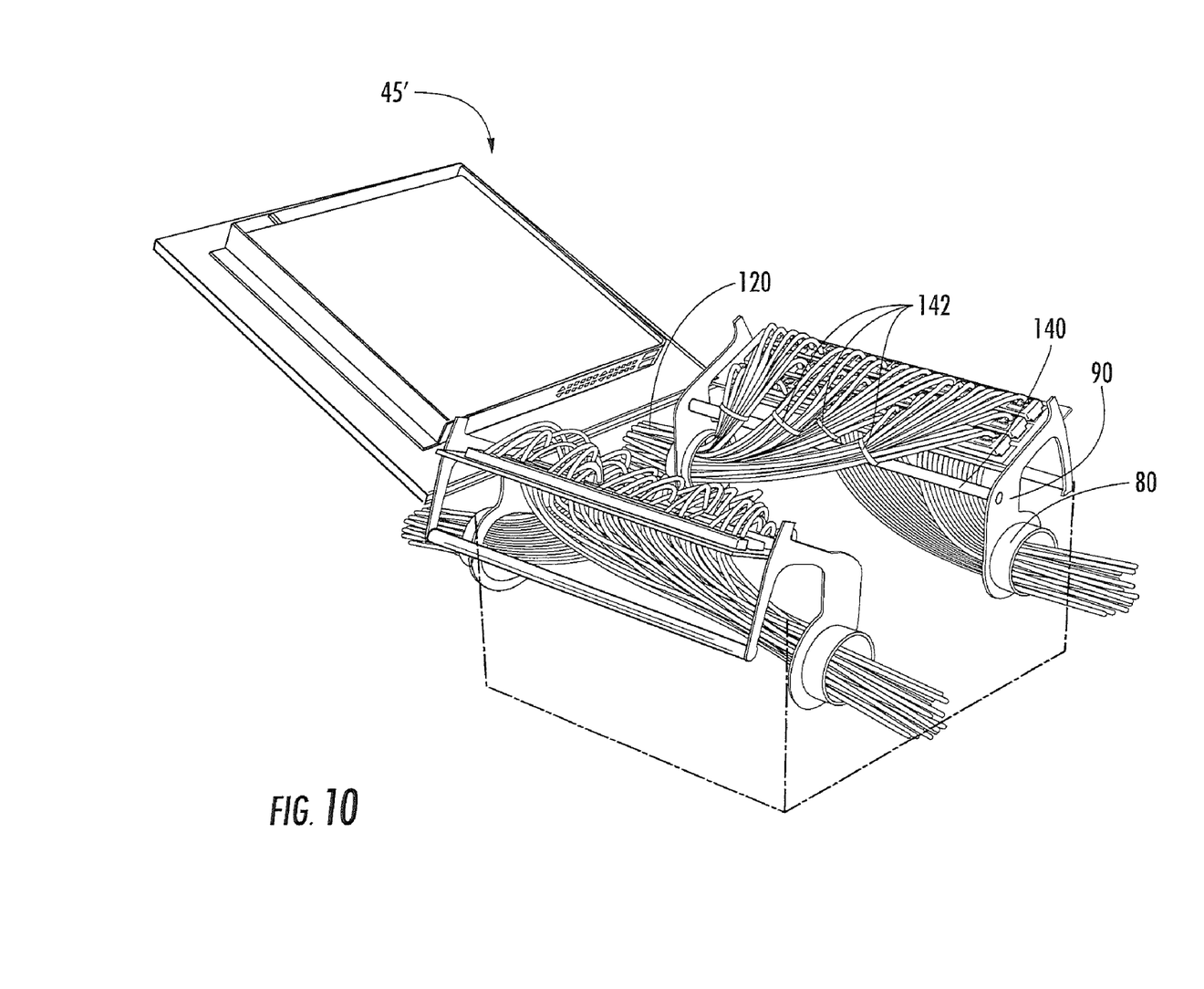
FIG. 10 is a perspective view of a floor or ceiling mount cable management system including a strain relief mechanism according to some embodiments of the present invention.

The cable management system could also incorporate a mechanism to assist in strain relief during rotation of the support frame(s) and corresponding rotation of the annular hub(s) and cable bundle(s), as exemplified by a cable management system 45' as seen in FIG. 10. In the embodiment shown in FIG. 10, the cables associated with the cable bundle 120 are secured in a manner that further encourages their rotation when the support frame 90 is rotated as described above. The cables making up the cable bundle 120 are secured to a member 140, such as a bar, by ties 142 or similar attaching means. Because the strain relief mechanism rotates with the support frame 90, strain and/or stress may be further reduced or eliminated at the cable/port interfaces.

In the embodiments described above, the cable management system is positioned within a floor system, typically with an enclosure positioned below the floor level in a plenum. However, in-ceiling cable management systems are also contemplated. That is, referring to FIGS. 1-10, the floor tile insert 20 could be a ceiling tile insert. The ceiling tile insert may be completely removable or may be hinged such that components such as the support frames 90 can be accessed. With an in-ceiling cable management system, the support frames 90 would be pulled "down" (as opposed to "up" with a floor mount cable management system) in order to access the second primary side $100_2$ of the patching fields 100. The in-ceiling cable management system may comprise the same components as the floor mount system and therefore may maintain the same advantages: reduction or elimination of cable slack loops and reduction or elimination of stress at cable/port interfaces. The ceiling tile insert may also be integrated with the rest of the ceiling, increasing aesthetic appeal.

The cable management systems shown in FIGS. 1-10 include the enclosure 50. However, other embodiments may not include an enclosure. For example, a member 55 (FIG. 8) useful in a cable management system may include at least one annular hub defining an axis (similar to the annular hubs 80 defining the axis A1 as described above), a rotatable support frame attached to the at least one annular hub (similar to the support frame 90 as described above), and a patching field comprising a plurality of ports mounted to the rotatable support frame, the patching field having first and second primary sides (similar to the patching field 100 having first and second primary sides $100_1$, $100_2$ as described above), wherein rotation of the rotatable support frame about the axis produces corresponding rotation of the at least one annular hub. The member may be useful, for example, where an enclosure already exists and the member can be installed in the preexisting enclosure. The member may further allow for flexibility in installation. For example, the member may be easily transportable and may allow for installation in either a floor or ceiling mount system, as described above, or in a wall or rack mount system, as described immediately below.

Figure 11:
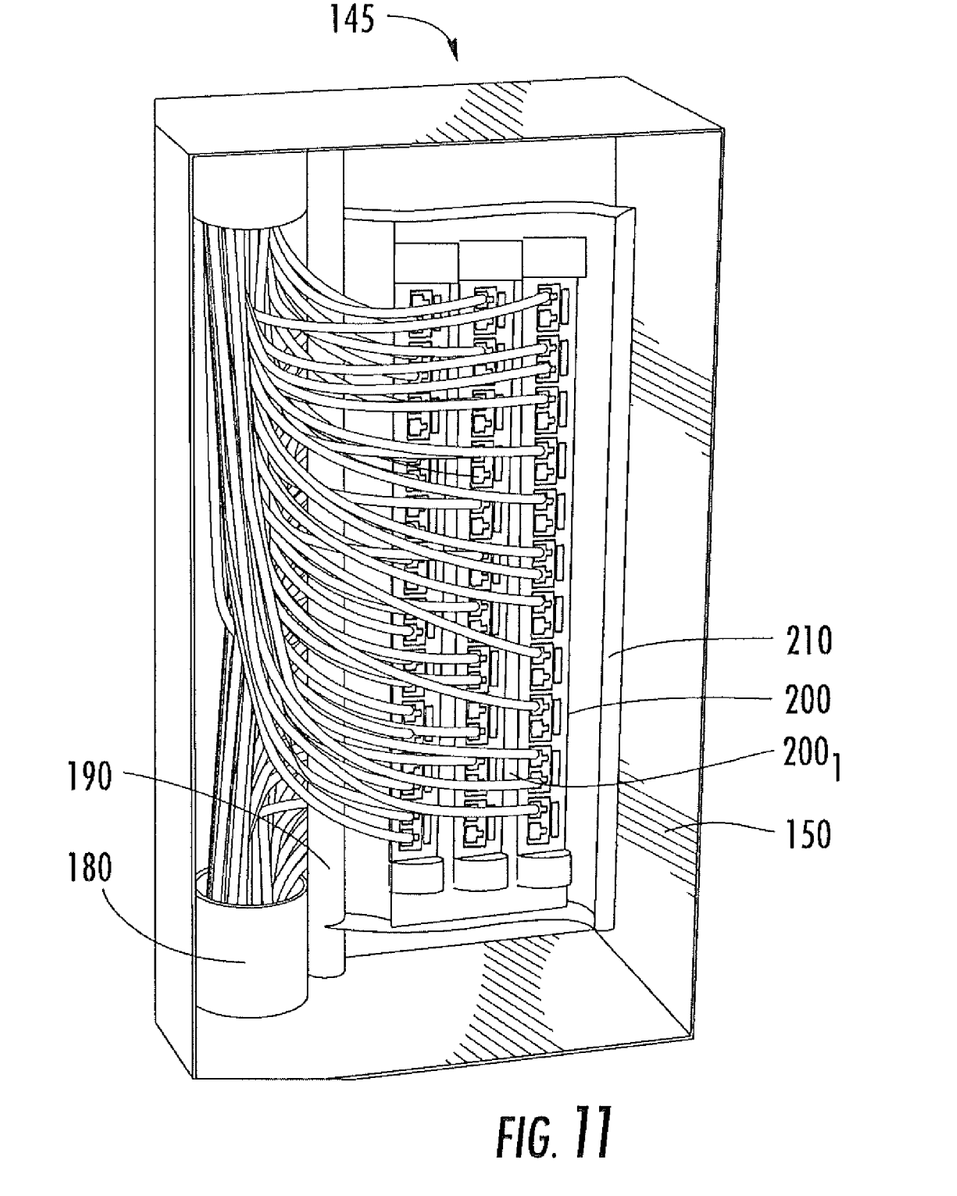
FIG. 11 is a perspective view of a wall mount cable management system with a closed support frame according to some embodiments of the present invention.

In addition to being floor mounted or in-ceiling, the cable management system may be wall mounted. FIG. 11 shows an exemplary embodiment of a wall mounted cable management system. A cable management system 145 includes at least one patching field 200 mounted on at least one support frame 190. Annular hubs 180 accommodate cable bundles. The support frame 190 and annular hubs 180 are oriented such that they rotate about a common axis defined by the annular hubs 180. Any cable bundle passing through the annular hubs 180 may rotate about the common axis as well. The first primary surface $200_1$ of the patching field 200 may be accessible when the support frame 190 is in its "retracted" position. The support frame 190 may be pulled "outward" to access the second primary surface $200_2$ of the patching field 200. Because the annular hubs 180 and any cable bundles passing therethrough may rotate together with the support frame 190, the need for cable slack loops may be reduced or eliminated and the stress at the cable/port interfaces may be reduced or eliminated. A member 210, such as a bar, may assist in pulling and thereby rotating the support frame 190 and other components.

The wall mount cable management systems, such as an exemplary wall mount cable management system 245 shown in FIG. 11, may include an enclosure 150. There may further be a cover on the enclosure (not pictured), similar to the floor and/or ceiling tile insert 20 seen in FIGS. 1 and 2. The cover may serve to protect components such as the patching field(s) 100 and cables. The cover may also serve aesthetic purposes (e.g., to blend the cable management system with the rest of the wall).

Figure 12:
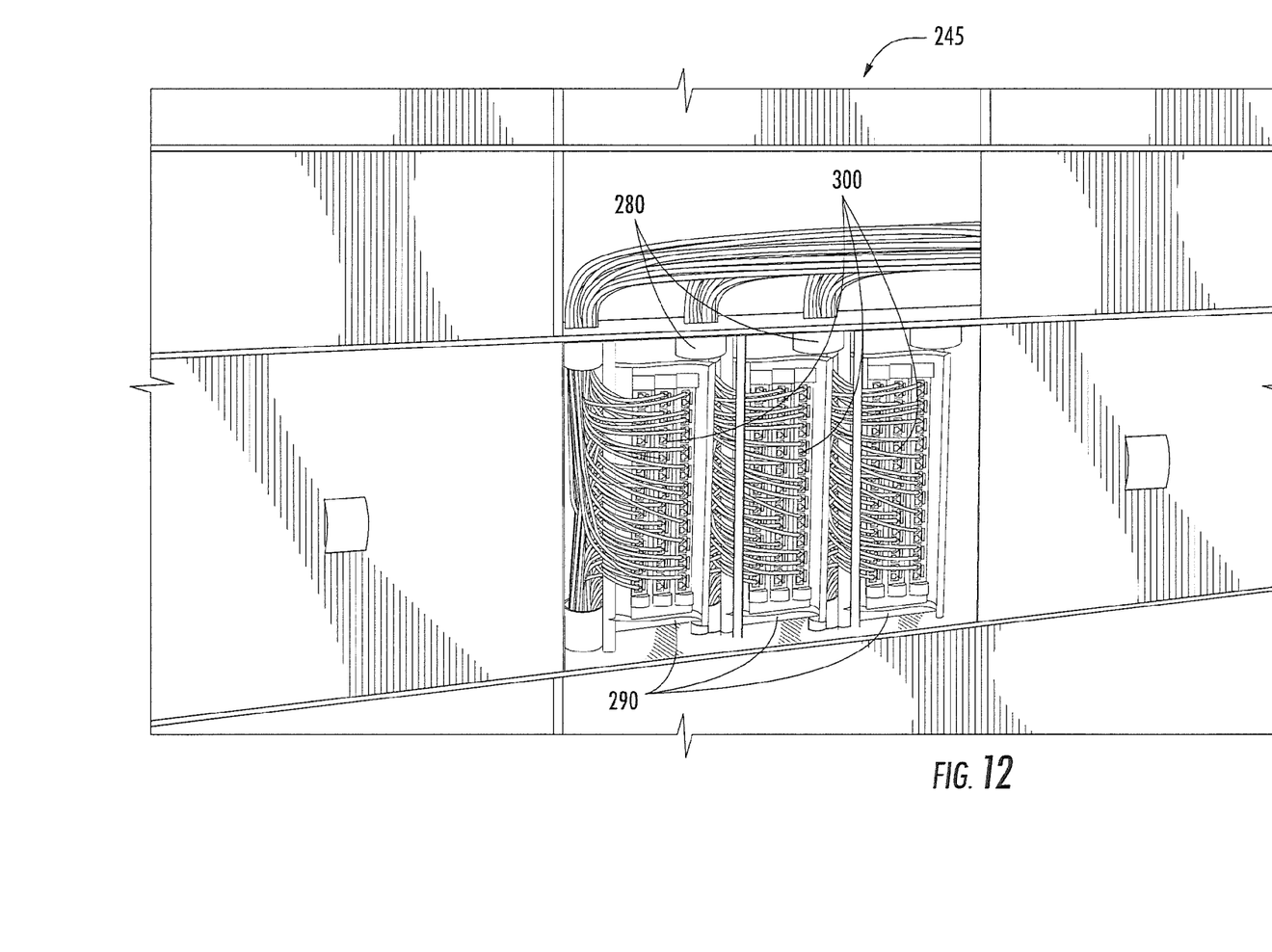
FIG. 12 is a perspective view of a wall mount cable management system with multiple closed support frames according to alternative embodiments of the present invention.

The embodiment shown in FIG. 11 includes one support frame 190 and one patching field 200 mounted thereon, with the patching field 200 oriented vertically. This configuration may be advantageous, for example, where the cable management system is designed to fit between wall studs, which may provide enhanced ergonomics and aesthetic value. However, it is contemplated that the wall mounted cable management system includes more than one support frame and more than one patching field. For example, the wall mounted cable management system may include two support frames and two patching fields as seen in the floor mounted and/or in-ceiling embodiments shown in FIGS. 4-10. Furthermore, more than two support frames and more than two patching fields may be adjacently positioned such as to fill a particular cabinet space. For example, the embodiment in FIG. 12 includes three support frames 290 and three patching fields 300 mounted thereon.

Figure 13:
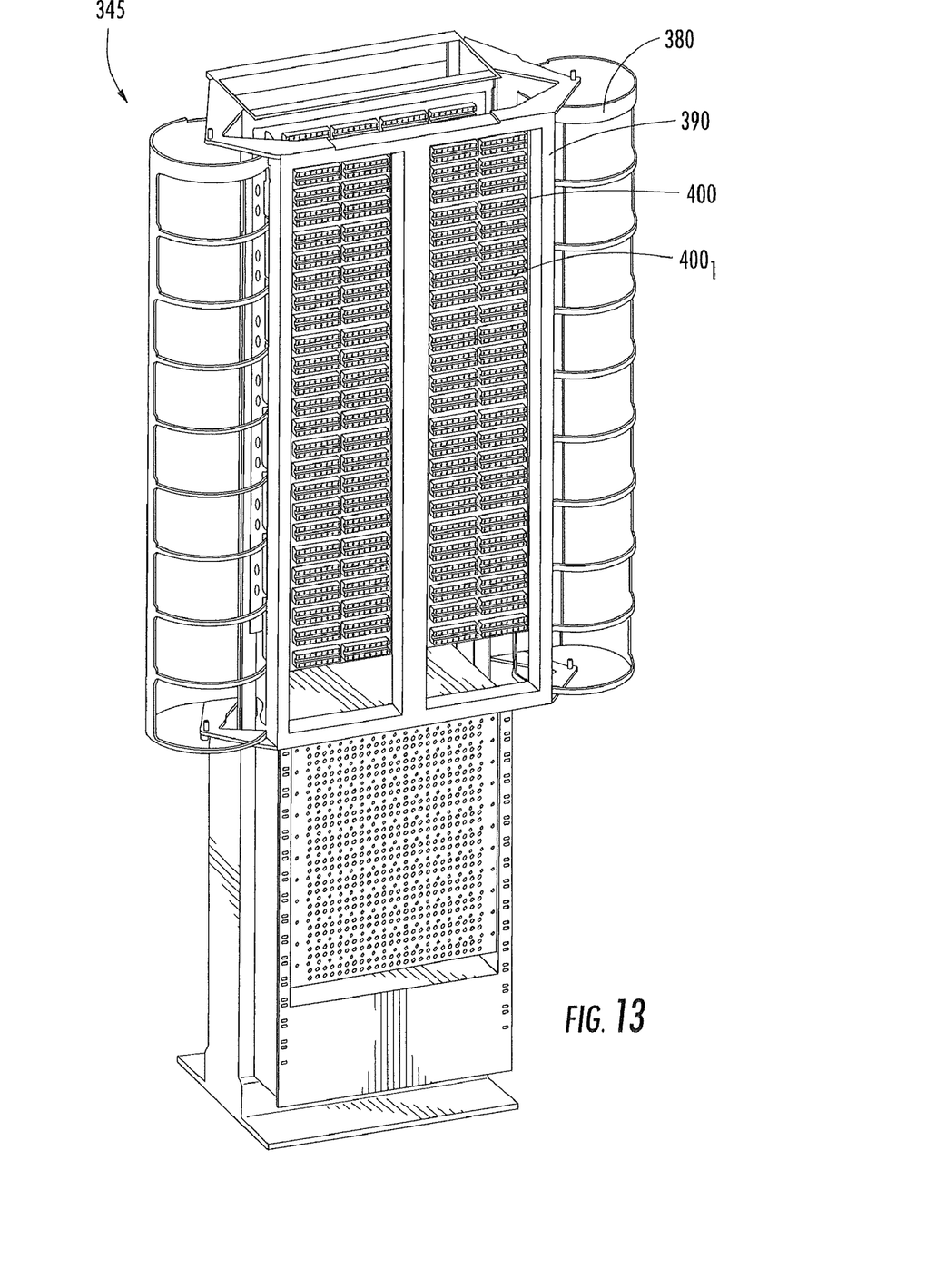
FIG. 13 is a perspective view of a rack mount cable management system with closed support frames according to some embodiments of the present invention.
Figure 14:
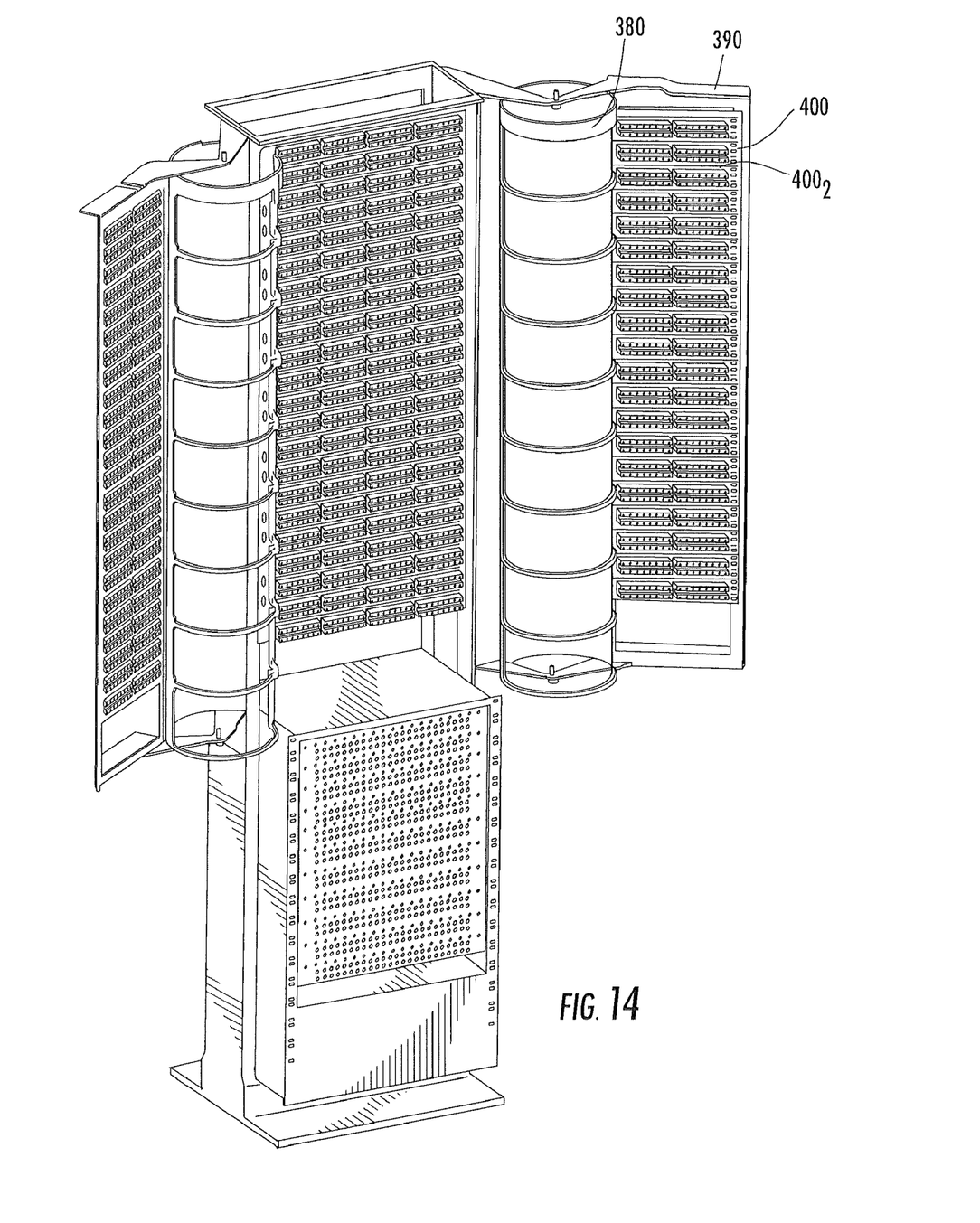
FIG. 14 is a perspective view of the system of FIG. 13 with rotated support frames.

FIGS. 13 and 14 show embodiments of a rack mounted cable management system 345. A rack mounted system may be advantageous in that it may be portable and thereby allow for greater flexibility within a workspace or building. Additionally, the rack mounted system may provide the space to contain active components, such as the active components described above. As described above in connection with the other cable management systems, annular hubs 380, through which cable bundles may pass, are connected to support frames 390. Mounted to the support frames 390 are patching fields 400, also as described above.

As seen in FIG. 13, when the cable management system is in its "retracted" position, the first primary side $400_1$ of the patching field 400 is accessible. When the support frames 390 are pulled "open," the second primary side $400_2$ of the patching field 400 becomes accessible, as shown in FIG. 14. This is accomplished with little to no cable slack loop because the annular hubs 380 and any cable bundles passing therethrough may rotate together with the support frames 390. As described above, an additional advantage is a reduction or elimination of stress at the cable/port interfaces.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable management system comprising:
   an enclosure having a plurality of sidewalls;
   at least one annular hub attached to one of the plurality of sidewalls of the enclosure and defining an axis;
   a rotatable support frame attached to the at least one annular hub;
   a patching field comprising a plurality of ports mounted to the rotatable support frame, the patching field having first and second primary sides;
   wherein rotation of the rotatable support frame about the axis produces corresponding rotation of the at least one annular hub about the axis, and wherein:
      the rotatable support frame has a first position wherein the first primary side of the patching field is exposed; and
      the rotatable support frame when rotated has a second position wherein the second primary side of the patching panel is exposed.

2. The cable management system of claim 1, wherein the system comprises at least two rotatable support frames.

3. The cable management system of claim 1, wherein at least one active component is housed within the enclosure.

4. The cable management system of claim 1, wherein the enclosure is configured to be a floor mount enclosure.

5. The cable management system of claim 1, wherein the enclosure is configured to be a ceiling mount enclosure.

6. The cable management system of claim 1, wherein the enclosure is configured to be a wall mount enclosure.

7. The cable management system of claim 1, wherein the enclosure is configured to be a rack mount enclosure.

8. The cable management system of claim 1, further comprising a display providing availability or status of the ports of the patching field.

9. The cable management system of claim 1, further comprising a locking handle on the outside of the enclosure.

10. The cable management system of claim 1, wherein the rotatable support frame includes a member configured to facilitate rotation.

11. The cable management system of claim 1, wherein the rotatable support frame includes a member configured to protect components.

12. The cable management system of claim 1, wherein the rotatable support frame includes a member configured to prevent over-rotation of the support frame.

13. The cable management system of claim 1, further comprising a cable strain relief mechanism that rotates with the rotatable support frame.

14. The cable management system of claim 1, wherein the at least one annular hub comprises two annular hubs, one annular hub attached to one of the plurality of sidewalls and the other annular hub attached to an opposed one of the plurality of sidewalls.

15. A cable management system comprising:
an enclosure having a plurality of sidewalls;
at least one annular hub attached to one of the plurality of sidewalls of the enclosure and defining an axis;
a rotatable support frame attached to the at least one annular hub;
a patching field comprising a plurality of ports mounted to the rotatable support frame, the patching field having first and second primary sides;
a cable bundle passing through the at least one annular hub, the cable bundle comprising cables that connect to the patching field;
wherein rotation of the rotatable support frame about the axis produces corresponding rotation of the at least one annular hub about the axis.

16. The cable management system of claim 15, wherein the system comprises at least two rotatable support frames.

17. The cable management system of claim 15, wherein at least one active component is housed within the enclosure.

18. The cable management system of claim 15, wherein the enclosure is configured to be a floor mount enclosure.

19. The cable management system of claim 15, wherein the enclosure is configured to be a ceiling mount enclosure.

20. The cable management system of claim 15, wherein the enclosure is configured to be a wall mount enclosure.

21. The cable management system of claim 15, wherein the enclosure is configured to be a rack mount enclosure.

22. The cable management system of claim 15, further comprising a display providing availability or status of the ports of the patching field.

23. The cable management system of claim 15, further comprising a locking handle.

24. The cable management system of claim 15, wherein the rotatable support frame includes a member to configured facilitate rotation.

25. The cable management system of claim 15, wherein the rotatable support frame includes a member to configured protect components.

26. The cable management system of claim 15, wherein the rotatable support frame includes a member configured to prevent over-rotation of the support frame.

27. The cable management system of claim 15, wherein:
the rotatable support frame has a first position wherein the first primary side of the patching field is exposed; and
the rotatable support frame when rotated has a second position wherein the second primary side of the patching panel is exposed.

28. The cable management system of claim 15, further comprising a strain relief mechanism designed to rotate with the rotatable support frame.

29. The cable management system of claim 15, wherein the at least one annular hub comprises two annular hubs, one annular hub attached to one of the plurality of sidewalls and the other annular hub attached to an opposed one of the plurality of sidewalls.

30. The cable management system of claim 29, wherein a second cable bundle passes through the second annular hub.

31. The cable management system of claim 15, wherein rotation of the rotatable support frame about the axis produces corresponding rotation of the at least one annular hub and the cable bundle.

* * * * *